(12) United States Patent
Arai et al.

(10) Patent No.: US 12,014,370 B2
(45) Date of Patent: Jun. 18, 2024

(54) PROCESSING APPARATUS, PROCESSING METHOD, AND NON-TRANSITORY STORAGE MEDIUM

(71) Applicant: NEC Corporation, Tokyo (JP)

(72) Inventors: Kan Arai, Tokyo (JP); Azusa Furukawa, Tokyo (JP); Kei Shibuya, Tokyo (JP); Hiroshi Hashimoto, Tokyo (JP); Makiko Akiguchi, Tokyo (JP); Ken Hanazawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 17/791,438

(22) PCT Filed: Jan. 23, 2020

(86) PCT No.: PCT/JP2020/002309
§ 371 (c)(1),
(2) Date: Jul. 7, 2022

(87) PCT Pub. No.: WO2021/149220
PCT Pub. Date: Jul. 29, 2021

(65) Prior Publication Data
US 2023/0069523 A1    Mar. 2, 2023

(51) Int. Cl.
*G06Q 20/40*    (2012.01)
*G06Q 20/10*    (2012.01)
(Continued)

(52) U.S. Cl.
CPC ....... *G06Q 20/40145* (2013.01); *G06Q 20/10* (2013.01); *G06Q 20/3267* (2020.05);
(Continued)

(58) Field of Classification Search
None
See application file for complete search history.

(56) References Cited

U.S. PATENT DOCUMENTS

| 9,911,290 B1 * | 3/2018 | Zalewski | G07G 1/0072 |
|---|---|---|---|
| 10,373,322 B1 * | 8/2019 | Buibas | G06T 7/246 |

(Continued)

FOREIGN PATENT DOCUMENTS

| JP | 2018-160107 A | 10/2018 |
|---|---|---|
| JP | 2019-086832 A | 6/2019 |

(Continued)

OTHER PUBLICATIONS

"Devin Coldewey, Inside Amazon's no surveillance-powered checkout convenience store, Tech Crunch, Jan. 21, 2018" (Year: 2018).*

(Continued)

*Primary Examiner* — Kito R Robinson
*Assistant Examiner* — Toan Duc Bui

(57) ABSTRACT

The present invention provides a processing apparatus (10) including: a registration unit (12) that recognizes, based on image processing, product discrimination information of a product picked up from a product placing space, and registers the recognized product discrimination information in association with customer discrimination information; and a settlement unit (13) that executes, when it is detected, based on image processing, that a customer having picked up the product performs a predetermined action, a settlement based on a registration content resulting from the registration unit (12).

9 Claims, 15 Drawing Sheets

(51) Int. Cl.
  *G06Q 20/32* (2012.01)
  *G06Q 20/38* (2012.01)
  *G06Q 20/42* (2012.01)
  *G06V 20/52* (2022.01)
  *G06V 40/20* (2022.01)

(52) U.S. Cl.
  CPC ........... *G06Q 20/389* (2013.01); *G06Q 20/42* (2013.01); *G06V 20/52* (2022.01); *G06V 40/20* (2022.01)

(56) References Cited

U.S. PATENT DOCUMENTS

| | | | | |
|---|---|---|---|---|
| 2016/0110703 | A1* | 4/2016 | Herring | G06Q 20/18 705/23 |
| 2019/0272581 | A1* | 9/2019 | Li | G07G 1/0054 |
| 2020/0364752 | A1* | 11/2020 | Okamoto | G06F 3/03547 |
| 2023/0301572 | A1* | 9/2023 | Tsujikawa | A61B 5/165 600/301 |

FOREIGN PATENT DOCUMENTS

| | | |
|---|---|---|
| JP | 2019-117473 A | 7/2019 |
| JP | 2019-150123 A | 9/2019 |
| WO | 2019/181499 A1 | 9/2019 |

OTHER PUBLICATIONS

International Search Report for PCT Application No. PCT/JP2020/002309, dated Mar. 17, 2020.
Takuya Miyata, "A Register-less Supermarket Achieved by a Mechanism 'a Camera and a Microphone' of Amazon Go", [online], Dec. 10, 2016, [retrieved on Dec. 6, 2019], the Internet <URL:https://www.huffingtonpost.jp/tak-miyata/amazon-go_b_13521384.html>.
Comparison of Recommended Twelve Selections of Office Convenience Stores: Mechanisms, Reputations, and Introduction Advantages [online], Nov. 18, 2019, [retrieved on Dec. 6, 2019], the Internet <URL:https://boxit.jp/mag/a5253/?utm_source=google&utm_medium=cpc&utm_campaign=office_c-z&gclid=EAlalQobChMlzJbdxKOg5gIVT3RgCh26uAb8EAAYAiAAEgKK-vD_BwE>.

* cited by examiner

FIG. 8

| CUSTOMER INFORMATION | | | | | | |
|---|---|---|---|---|---|---|
| CUSTOMER DISCRIMINATION INFORMATION | NAME | CONTACT INFORMATION | FACE IMAGE | FEATURE VALUE | SETTLEMENT MEANS INFORMATION | ... |
| MP12189 | TARO TOKYO | 090-·····  TOKYO····· | ××××.jpg | *** | CREDIT CARD INFORMATION (·········) | ··· |
| ······ | ····· | ······ | ××××× | ····· | ····· | ····· |

FIG. 9

PRODUCT INFORMATION

| CUSTOMER DISCRIMINATION INFORMATION | PRODUCT NAME | UNIT PRICE (YEN) | IMAGE | FEATURE VALUE | ・・・・・ |
|---|---|---|---|---|---|
| P0131 | A JUICE | 110 | ・・・.jpg | ✱✱✱ | ・・・・・ |
| ・・・・・ | ・・・・・ | ・・・・・ | ・・・・・ | ・・・・・ | ・・・・・ |

FIG. 10

DISCRIMINATION INFORMATION

☆CUSTOMER DISCRIMINATION INFORMATION : MP12189

☆SETTLEMENT TARGET PRODUCT (1) PRODUCT DISCRIMINATION INFORMATION : P0131

UNIT PRICE     : 110 YEN (2) PRODUCT DISCRIMINATION INFORMATION :   —

UNIT PRICE     :   —

．
．
．
．
．

PROCESSING APPARATUS, PROCESSING METHOD, AND NON-TRANSITORY STORAGE MEDIUM

This application is a National Stage Entry of PCT/JP2020/002309 filed on Jan. 23, 2020, the contents of all of which are incorporated herein by reference, in their entirety.

TECHNICAL FIELD

The present invention relates to a processing apparatus, a processing method, and a program.

BACKGROUND ART

Non-Patent Document 1 and Patent Documents 1 and 2 disclose a store system in which settlement processing (product registration, payment, and the like) at a register counter is eliminated.

Specifically, in a store system disclosed in Non-Patent Document 1, a gate is installed at an entrance of a store, and based on information read by a reader installed at the gate, a customer entering the store is recognized. Then, the store system recognizes, based on image processing or the like, a product picked up by the customer and executes a settlement at a timing when the customer leaves the store through the gate.

In a purchased-product settlement support system disclosed in Patent Document 1, a gate is installed, store entering/leaving of a customer passing through the gate is managed, and after the customer passes through the gate and leaves the store, settlement processing for a product brought out from the store by the customer is executed.

In a settlement system for a vehicle disclosed in Patent Document 2, a product placing unit is disposed in an interior of a vehicle, and when a predetermined condition is satisfied after detection of movement of a product to an outside of the vehicle, settlement processing for the product is executed.

Non-Patent Document 2 discloses a store in which a product such as confectionary, a beverage, and the like is displayed at a part of an office, a settlement means such as a cashless settlement terminal, a cash collection box, and the like is installed, and an employee of the office purchases a product on a self-service basis.

RELATED DOCUMENT

Patent Document

[Patent Document 1] Japanese Patent Application Publication No. 2019-86832
[Patent Document 2] Japanese Patent Application Publication No. 2019-117473

Non-Patent Document

[Non-Patent Document 1] Takuya Miyata, "A Register-less Supermarket Achieved by a Mechanism "a Camera and a Microphone" of Amazon Go", [online], Dec. 10, 2016, [retrieved on Dec. 6, 2019], the Internet<URL:https://www.huffingtonpost.jp/tak-miyata/amazon-go_b_13521384.html>
[Non-Patent Document 2] "Comparison of Recommended Twelve Selections of Office Convenience Stores: Mechanisms, Reputations, and Introduction Advantages" [online], Nov. 18, 2019, [retrieved on Dec. 6, 2019], the Internet<URL:https://boxil.jp/mag/a5253/?utm_source=google&utm_medium=cpc&utm_campa ign=office_c-z&gclid=EAIaIQobChMIz JbdxKOg5gIVT3RgCh26uAb8EAAYAiAAEgKK-vD_BwE>

DISCLOSURE OF THE INVENTION

Technical Problem

By using the techniques disclosed in Non-Patent Document 1 and Patent Documents 1 and 2, when settlement processing at a register counter is eliminated, convenience for a user is increased and time and labor of a store are saved. However, the techniques disclosed in Non-Patent Document 1 and Patent Document 1 each are a technique requiring presence of a gate, and therefore it is difficult to use these techniques in an environment where it is difficult to install a gate. Further, the technique disclosed in Patent Document 2 is a technique requiring presence of a vehicle, and therefore it is difficult to use the technique in an environment where it is difficult to use a vehicle. For example, in a store in which a store, as disclosed in Non-Patent Document 2, is installed at a part of an office, due to a problem such as a cost and a space, it is difficult to use a gate and a vehicle in some cases.

An issue of the present invention is to achieve, by using a non-conventional and new method, a store system in which settlement processing (product registration, payment, and the like) at a register counter is eliminated.

Solution to Problem

According to the present invention,
provided is a processing apparatus including:
a registration means for recognizing, based on image processing, product discrimination information of a product picked up from a product placing space, and registering the recognized product discrimination information in association with customer discrimination information; and
a settlement means for executing, when it is detected, based on image processing, that a customer having picked up the product performs a predetermined action, a settlement based on a registration content resulting from the registration means.

Further, according to the present invention,
provided is a processing method including:
by a computer,
recognizing, based on image processing, product discrimination information of a product picked up from a product placing space, and registering the recognized product discrimination information in association with customer discrimination information; and
executing, when it is detected, based on image processing, that a customer having picked up the product performs a predetermined action, a settlement based on a registration content of the product discrimination information.

Further, according to the present invention,
provided is a program for causing a computer to function as:
a registration means for recognizing, based on image processing, product discrimination information of a product picked up from a product placing space, and registering the recognized product discrimination information in association with customer discrimination information; and
a settlement means for executing, when it is detected, based on image processing, that a customer having picked up the product performs a predetermined action, a settlement based on a registration content resulting from the registration means.

Advantageous Effects of Invention

According to the present invention, by using a non-conventional and new method, a store system in which settlement processing (product registration, payment, and the like) at a register counter is eliminated is achieved.

BRIEF DESCRIPTION OF THE DRAWINGS

The above-described object, other objects, features, and advantages will become more apparent from a preferred example embodiment described below and the following accompanying drawings.

FIG. 8 is a diagram schematically illustrating one example of information processed by the processing apparatus according to the present example embodiment.

FIG. 9 is a diagram schematically illustrating one example of information processed by the processing apparatus according to the present example embodiment.

FIG. 10 is a diagram schematically illustrating one example of information processed by the processing apparatus according to the present example embodiment.

DESCRIPTION OF EMBODIMENTS

First Example Embodiment

First, by using FIGS. 1 to 5, a whole image and an outline of a processing apparatus according to the present example embodiment are described. The processing apparatus according to the present example embodiment is used in a store in which a product such as confectionary, a beverage, and the like is displayed at a part of an office and an employee of the office purchases a product on a self-service basis.

Figure 1:
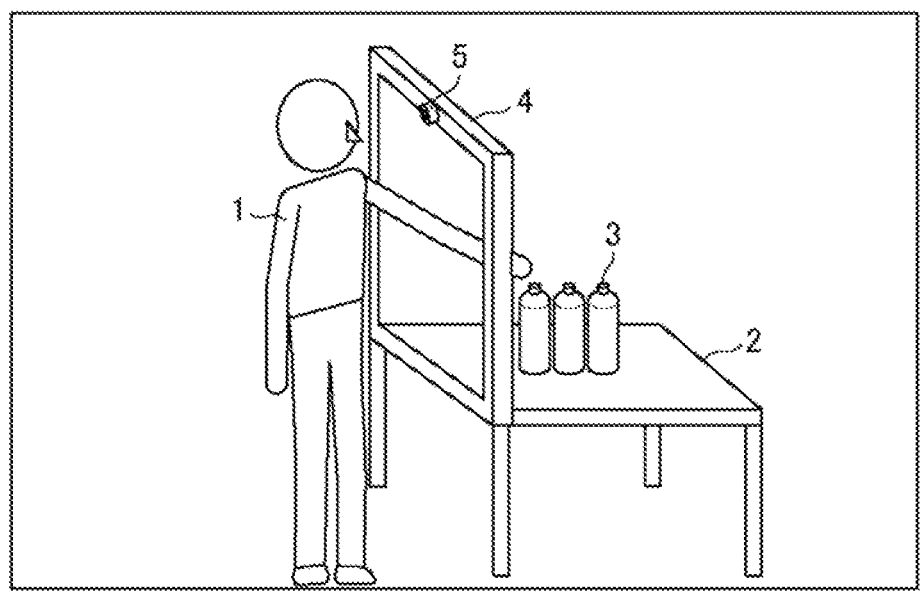
FIG. 1 is a diagram for illustrating an outline of a processing apparatus according to the present example embodiment.

As illustrated in FIG. 1, a product placing space 2 where a product 3 is placed is disposed at a part of an office or the like. A camera 5 installed in a frame 4 captures an image of a customer 1 picking up the product 3 from the product placing space 2.

Figure 2:
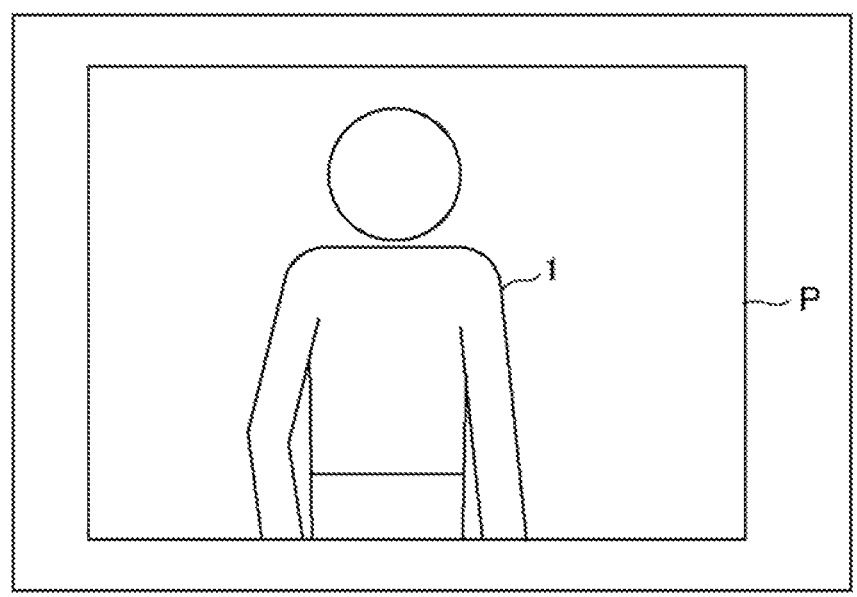
FIG. 2 is a diagram for illustrating an outline of the processing apparatus according to the present example embodiment.

As illustrated in FIG. 2, an image generated by the camera 5 includes the customer 1 located in front of the product placing space 2. The processing apparatus analyzes the image and recognizes the customer 1 included in the image.

Figure 3:
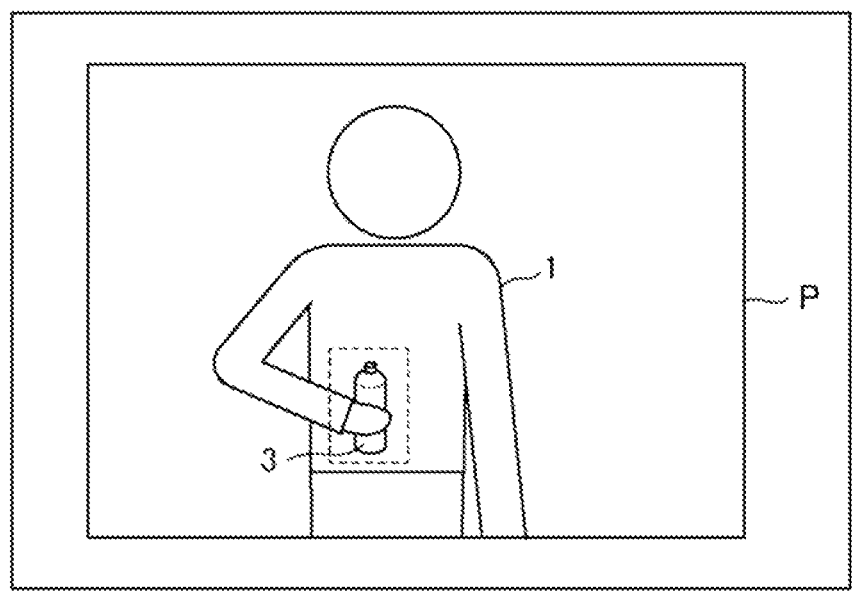
FIG. 3 is a diagram for illustrating an outline of the processing apparatus according to the present example embodiment.
Figure 4:
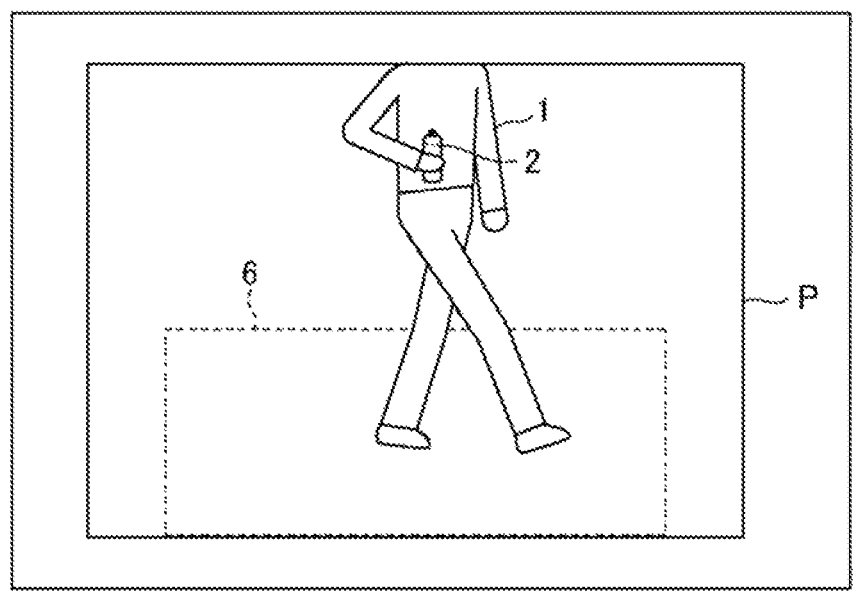
FIG. 4 is a diagram for illustrating an outline of the processing apparatus according to the present example embodiment.
Figure 5:
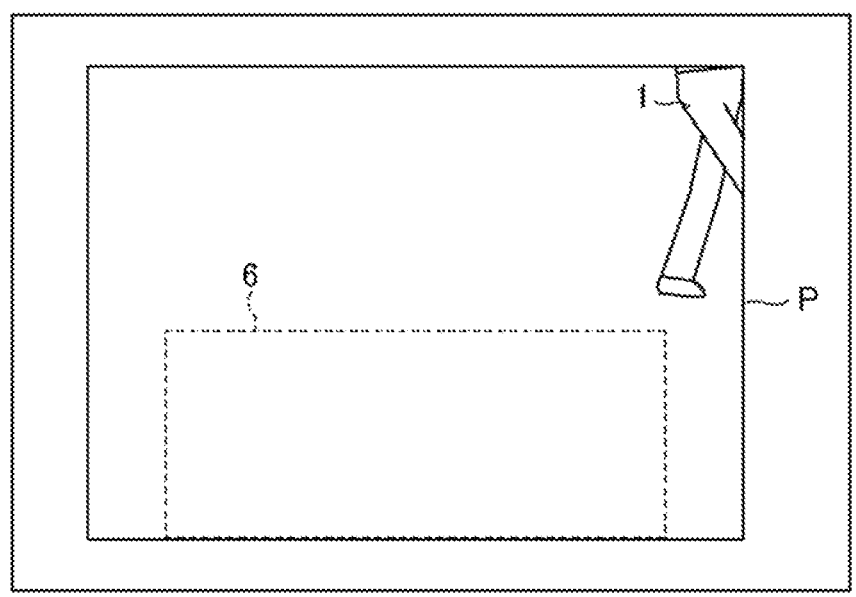
FIG. 5 is a diagram for illustrating an outline of the processing apparatus according to the present example embodiment.

Further, as illustrated in FIG. 3, an image generated by the camera 5 includes the product 3 held by the customer 1 located in front of the product placing space 2. The processing apparatus analyzes the image and recognizes the product 3 held by the customer 1.

Then, the processing apparatus executes, when analyzing the image and detecting that the customer 1 holding the product 3 performs a predetermined action, settlement processing based on the recognition result in response to the detection. A "predetermined action" according to the present example embodiment is described as a matter in that "a customer 1 goes out of a reference range 6". More specifically, the processing apparatus executes, when detecting that the customer 1 holding the product 3 goes out of a reference range 6 (see FIGS. 4 and 5), settlement processing based on the recognition result in response to the detection. According to the present example embodiment, a reference range 6 is determined based on the product placing space 2. For example, a predetermined area (an area to which a customer 1 being considering purchase of a product 3 is thought to move while holding the product 3) in front of the product placing space 2 is determined as a reference range 6.

According to the processing apparatus of the present example embodiment as described above, by using a non-conventional and new method, a store system in which settlement processing (product registration, payment, and the like) at a register counter is eliminated is achieved.

Next, a configuration of the processing apparatus is described in detail. First, one example of a hardware configuration of the processing apparatus is described.

Each function unit in the processing apparatus is achieved based on any combination of hardware and software mainly including a central processing unit (CPU) of any computer, a memory, a program loaded onto a memory, a storage unit such as a hard disk and the like storing the program (the storage unit being capable of storing, in addition to a program previously stored from a stage at which an apparatus is shipped, a program downloaded from a storage medium such as a compact disc (CD) and the like, a server on the Internet, and the like), and a network-connection interface. Then, it should be understood by those of ordinary skill in the art that in an achievement method and an apparatus for the above, there are various modified examples.

Figure 6:
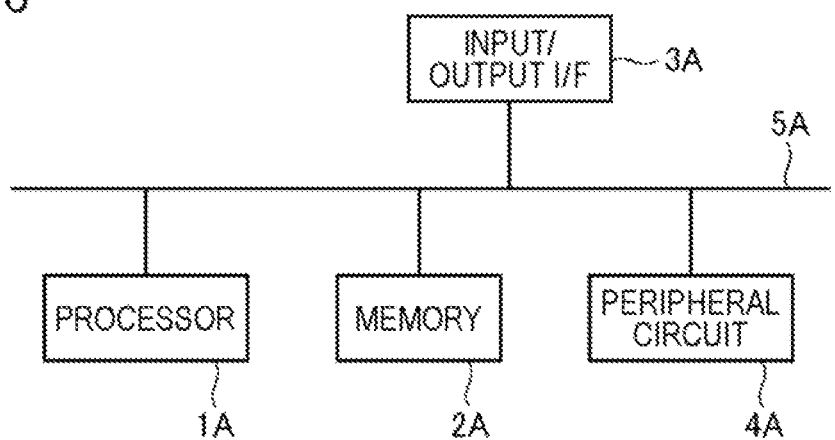
FIG. 6 is a diagram illustrating one example of a hardware configuration of the processing apparatus according to the present example embodiment.

FIG. 6 is a block diagram illustrating a hardware configuration of the processing apparatus. As illustrated in FIG. 6, the processing apparatus includes a processor 1A, a memory 2A, an input/output interface 3A, a peripheral circuit 4A, and a bus 5A. The peripheral circuit 4A includes various modules. The processing apparatus may not necessarily include the peripheral circuit 4A. Note that, the processing apparatus may be configured by a plurality of apparatuses physically and/or logically separated, or may be configured by one apparatus physically and/or logically integrated. When the processing apparatus is configured by a plurality of apparatuses physically and/or logically separated, each of the plurality of apparatuses can include the above-described hardware configuration.

The bus 5A is a data transmission path through which the processor 1A, the memory 2A, the peripheral circuit 4A, and the input/output interface 3A mutually transmit/receive data. The processor 1A is an arithmetic processing apparatus, for example, such as a CPU and a graphics processing unit (GPU). The memory 2A is a memory, for example, such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, or the like. The output apparatus is, for example, a display, a speaker, a printer, a mailer, or the like. The processor 1A issues an instruction to each module, and can perform an arithmetic operation, based on an arithmetic operation result of the module.

Figure 7:
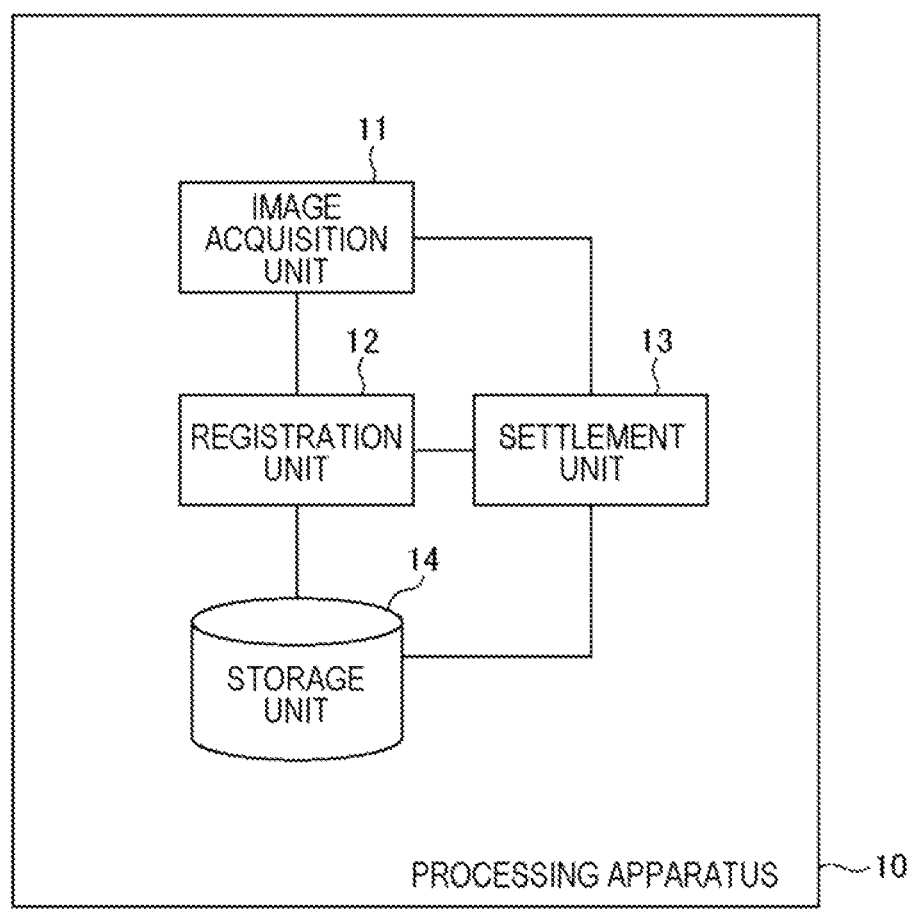
FIG. 7 is one example of a function block diagram of the processing apparatus according to the present example embodiment.

FIG. 7 illustrates one example of a function block diagram of a processing apparatus 10. As illustrated, the processing apparatus 10 includes an image acquisition unit 11, a registration unit 12, a settlement unit 13, and a storage unit 14. Note that, the processing apparatus 10 may not necessarily include the storage unit 14. In this case, an external apparatus configured communicably with the processing apparatus 10 includes the storage unit 14.

The storage unit 14 stores various types of information. The storage unit 14 stores, for example, customer information as illustrated in FIG. 8 and product information as illustrated in FIG. 9.

Customer information is information relating to a customer 1 using a store disposed at a part of an office or the like. Based on a previous registration operation performed by a customer 1 using the store, customer information of each customer 1 is stored in the storage unit 14.

In illustrated customer information, customer discrimination information for discriminating a plurality of customers from each other, a name, contact information, a face image, a feature value extracted from the face image, and settlement means information are associated with one another. The settlement means information is information for executing a settlement in a store, and includes, for example, but not limited to, credit card information, account information, information for indicating a matter that deduction from a salary is hoped and achieving processing therefor, user discrimination information of a settlement service (a code settlement service, an electronic money service, a point service, and the like), and the like. Note that, the illustrated customer information is merely one example, and may include information relating to other items or may not necessarily include a part of illustrated items.

Product information is information relating to a product 3 handled in a store. In illustrated product information, product discrimination information for discriminating a plurality of products from each other, a product name, a unit price, an image, and a feature value extracted from the image are associated with one another. Note that, an image of each product 3 may include a plurality of images in which an image of the product 3 is captured from a plurality of directions.

The image acquisition unit 11 acquires an image generated by a camera 5 capturing an image of an area of a front (a side where a product 3 is picked up) of the product placing space 2. The processing apparatus 10 and the camera 5 are connected with wire and/or wirelessly, and configured communicably with each other. The image acquisition unit 11 acquires, based on real-time processing, an image generated by the camera 5.

The camera 5 is installed in a location and a direction for generating an image including "a face of a customer 1 located in front of the product placing space 2" and "a product 3 held by the customer 1". Note that, the camera 5 may be installed in a location and a direction for generating an image further including, in addition to the image-capture targets described above, at least either of "a boundary of a reference range 6" and "a product 3 placed in the product placing space 2".

According to the present example embodiment, one camera 5 generates an image including an image-capture target as described above. The camera 5 may include a fish-eye lens, or may include a standard lens (e.g., an angle of view of approximately 40° to approximately 60°).

The camera 5 generates a moving image. The camera 5 may always capture an image, or may capture an image only in a predetermined period (e.g., a period in which a person located in front of the product placing space 2 is detected by a human body sensor).

The registration unit 12 recognizes customer discrimination information of a customer 1 included in an image. The registration unit 12 may recognize, when detecting, for example, a face of a person from an image, a customer 1 included in the image, by using collation processing based on a feature value extracted from the detected face of the person and a feature value (see FIG. 8) of the customer 1 stored in the storage unit 14.

Further, the registration unit 12 recognizes, based on image processing, product discrimination information of a product 3 picked up from the product placing space 2. The registration unit 12 may recognize, when detecting, for example, that a recognized customer 1 holds an object, a product 3 (a product 3 picked up from the product placing space 2) held by the customer 1, by using collation processing based on a feature value extracted from the object and a feature value (see FIG. 9) of the product 3 stored in the storage unit 14.

Then, the registration unit 12 stores a recognition result in the storage unit 14. FIG. 10 schematically illustrates one example of information (recognition information) stored in the storage unit 14 by the registration unit 12. As illustrated, the registration unit 12 registers recognized customer discrimination information in recognition information. Then, the registration unit 12 registers recognized product discrimination information in the recognition information in association with the recognized customer discrimination information. Note that, the registration unit 12 further may read a unit price and the like associated with the recognized product discrimination information from product information (see FIG. 9), and register the read unit price and the like in the recognition information.

Further, the registration unit 12 detects, based on image processing, that a product 3 held by a customer 1 is returned to the product placing space 2. Then, the registration unit 12 updates, when detecting that the product 3 held by the customer 1 is returned to the product placing space 2, recognition information (see FIG. 10) in response to the detection. Specifically, the registration unit 12 deletes, from recognition information, product discrimination information and the like of the product 3 returned to the product placing space 2.

Herein, one example of an algorithm for detecting that a product 3 held by a customer 1 is returned to the product placing space 2 is described. The registration unit 12 may determine, when detecting, for example, a state change from "a state where a customer 1 holds a product 3" to "a state where the customer 1 does not hold the product 1", that the product 3 held by the customer 1 has been returned to the product placing space 2. However, in the algorism, when, for example, a product 3 held by a customer 1 is stored in his/her own bag, it is erroneously detected that the product 3 has been returned to the product placing space 2. Therefore, in order to avoid such erroneous detection, the detection may be executed based on an algorithm as described below.

The registration unit 12 may determine, when detecting, for example, a state change from "a state where a customer 1 holds a product 3" to "a state where the customer 1 does not hold the product 1", whether a movement track in an image of the product 3 before the state change satisfies a predetermined condition. Then, when the predetermined condition is satisfied, it may be determined that the product 3 held by the customer 1 has been returned to the product placing space 2.

The predetermined condition for a movement track includes "movement toward the product placing space 2", "movement toward the product placing space 2 and also movement for reaching a predetermined location in an image", "movement for reaching a predetermined location in an image", and the like. A predetermined location in an image is, when the product placing space 2 is included in an image, the product placing space 2, and is, when the product placing space 2 is not included in an image, a location an image of which is captured immediately before a product 3 moving toward the product placing space 2 is framed out, or the like.

When a predetermined condition for such a movement track is determined, it is possible to reduce a disadvantage of erroneously updating recognition information due to an action in which a customer 1 puts a product 3 into a bag, a pouch, or the like, an action in which a customer 1 eats a product 3, an event in which a product 3 is in a dead angle of a camera 5 due to a way of holding the product 3, and the like.

Referring back to FIG. 7, the settlement unit 13 executes a settlement based on a registration content resulting from the registration unit 12, in response to a matter that it is detected, based on image processing, that a customer 1 who picks up a product 3 from the product placing space 2 and does not return the product 3 to the product placing space 2 moves outside a reference range 6 determined based on the product placing space 2. More specifically, the settlement unit 13 executes a settlement based on a registration content resulting from the registration unit 12, in response to a matter that it is detected, based on image processing, that a customer 1 for whom at least one piece of product discrimination information is registered in recognition information (see FIG. 10) moves outside a reference range 6.

The reference range 6 is an area in a front (on a side where a product 3 is picked up) of the product placing space 2 (an area to which a customer 1 being considering, while holding a product 3, purchase of the product 3 is thought to move). A size and a shape of the reference range 6 are a design matter. Information indicating a reference range 6 in an image may be previously stored in the storage unit 14.

When, for example, the camera 5 generates an image including a boundary of a reference range 6, the settlement unit 13 may monitor, based on image processing, whether a part of a body of a customer 1 is present in the reference range 6. The settlement unit 13 may determine that a customer 1 moves outside the reference range 6, for example, in response to detecting that a foot of the customer 1 goes out of the reference range 6. Note that, the settlement unit 13 may monitor whether a portion other than a foot of a body of a customer 1 is present in a predetermined area in an image, and determine that the customer 1 moves outside the reference range 6, in response to detecting that the portion of the body of the customer 1 goes out of the predetermined area.

The settlement unit 13 executes a settlement for a predetermined price, based on settlement means information (see FIG. 8) previously registered with respect to each customer 1.

Note that, according to the present example embodiment in which one camera 5 is installed, the registration unit 12 and the settlement unit 13 process an image generated by the same camera 5, and perform recognition of a customer 1 and a product 3 and detection that the customer 1 moves outside a reference range 6.

Figure 11:
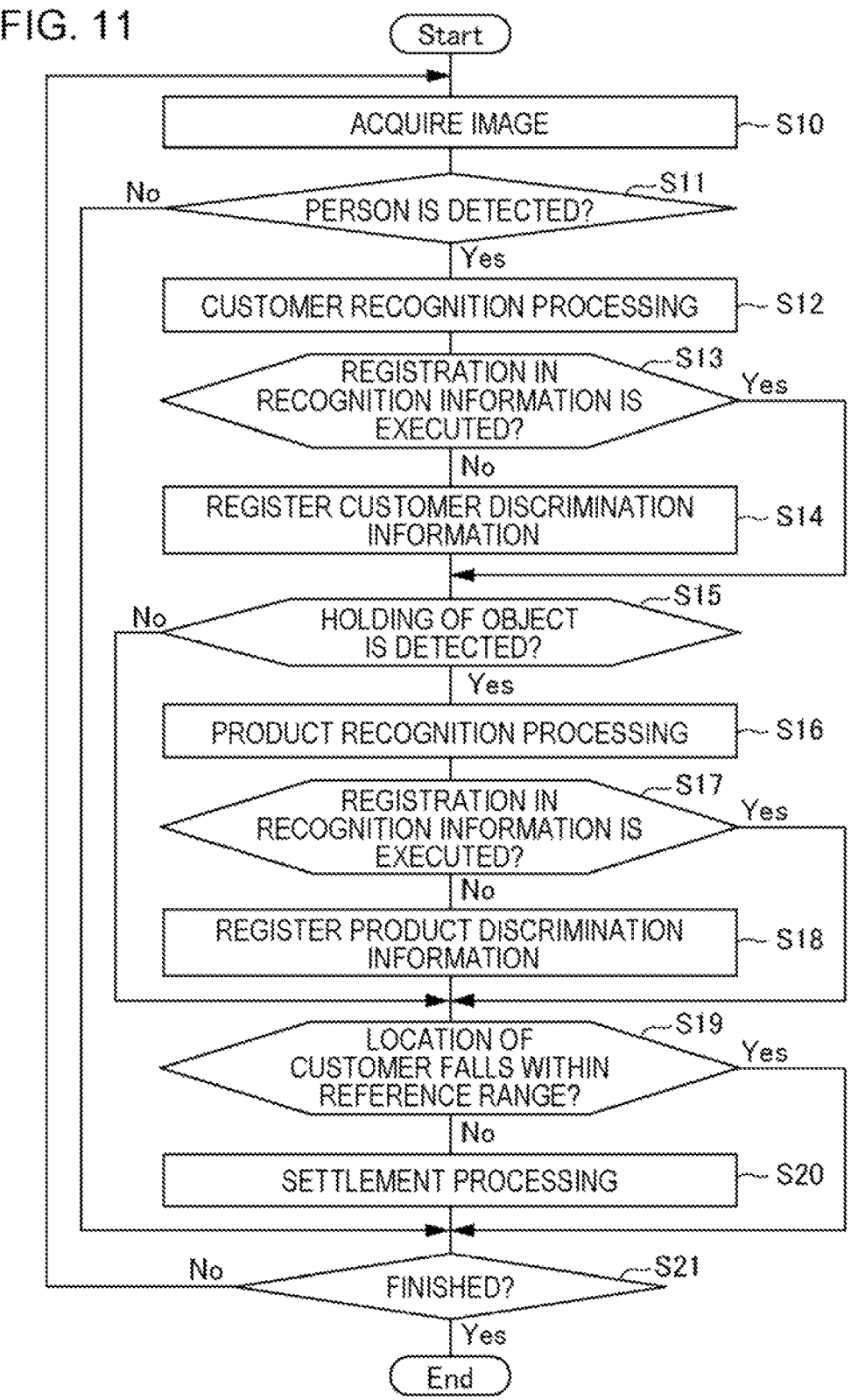
FIG. 11 is a flowchart illustrating one example of processing of the processing apparatus according to the present example embodiment.

Next, by using a flowchart in FIG. 11, one example of a flow of processing of the processing apparatus 10 is described.

When the image acquisition unit 11 acquires an image (S10), the registration unit 12 executes processing of detecting a face of a person from the image (S11). When a face of a person is not detected from the image (No in S11), processing moves to S21. On the other hand, when a face of a person is detected from the image (Yes in S11), the registration unit 12 recognizes a customer 1 included in the image by customer recognition processing including collation processing based on a feature value extracted from the detected face of the person and a feature value (see FIG. 8) of the customer 1 stored in the storage unit 14 (S12).

Then, the registration unit 12 registers, when customer discrimination information of the recognized customer 1 is not registered in recognition information (see FIG. 10) (No in S13), the customer discrimination information in the recognition information (S14). At that time, another piece of customer information may be registered in the recognition information. Another piece of customer information is settlement means information of the customer, or the like. Settlement means information may be previously stored in the storage unit 14 by registration processing based on a customer him/herself via an application, a website, or the like. Then, the registration unit 12 may register, in the recognition information, settlement means information and the like stored in the storage unit 14. In addition, input of settlement means information may be received from a customer on site via a predetermined input apparatus. Then, the registration unit 12 may register, in the recognition information, settlement means information and the like input on site. On the other hand, when customer discrimination information of the recognized customer 1 is already registered in the recognition information (see FIG. 10) (Yes in S13), the registration unit 12 does not update the registration information.

Thereafter, the registration unit 12 determines, based on the image, whether the customer 1 holds an object (S15). When it is not detected that the customer 1 holds an object (No in S15), processing moves to S19. On the other hand, when it is detected that the customer 1 holds an object (Yes in S15), the registration unit 12 recognizes, by collation processing based on a feature value extracted from the object and a feature value (see FIG. 9) of a product 3 stored in the storage unit 14, a product (a product 3 picked up by the customer 1 from the product placing space 2) held by the customer 1 (S16).

Then, the registration unit 12 registers, when product discrimination information of the recognized product 3 is not registered in the recognition information (see FIG. 10) (No in S17), the product discrimination information in the registration information (S18). At that time, the registration unit 12 may read, from product information (see FIG. 9), information (a unit price, a product name, and the like) associated with the product discrimination information, and register the read information in the recognition information. On the other hand, when product discrimination information of the recognized product 3 is already registered in the recognition information (see FIG. 10) (Yes in S17), the registration unit 12 does not update the recognition information.

Note that, a unit price of a product may be dynamically determined based on at least either of "customer information including at least one of a gender, an age group, and a purchase history" and "information of stock and the like relating to at least either of stock and sales of a product at that time".

For example, a function for outputting a unit price when a value of a predetermined parameter included in customer information and/or information of stock and the like is input, a table indicating an association relation between a value of a predetermined parameter included in customer information and/or information of stock and the like and a unit price, and the like may be stored in the storage unit 14. Further, information indicating stock or sales of a product may be stored in the storage unit 14. Furthermore, customer information as described above may be stored in the storage unit 14. Then, the registration unit 12 may determine, based on these pieces of information, a unit price with respect to each customer.

Then, the settlement unit 13 determines, based on image processing, whether the customer 1 is present in a reference range 6 (S19). When a location of the customer 1 is outside of the reference range 6 (No in step 19), the settlement unit 13 executes settlement processing, based on recognition information (see FIG. 10) at that time (S20). In other words, the settlement unit 13 determines a payment price computed based on the recognition information. Then, when the determined payment price is not "0", the settlement unit 13 executes payment processing for the determined payment price, by using settlement means information previously registered in association with the customer 1. When the determined payment price is "0", the settlement unit 13 does not execute payment processing using settlement means information. Note that, when a location of the customer 1 falls within the reference range 6 (Yes in step 19), the settlement unit 13 does not execute settlement processing. Thereafter, processing returns to S10 and similar processing is repeated.

Next, an advantageous effect of the processing apparatus 10 according to the present example embodiment is described. According to the processing apparatus 10 of the present example embodiment, by using a non-conventional and new method, a store system in which settlement processing (product registration, payment, and the like) at a register counter is eliminated is achieved. Therefore, even in a store in which it is difficult to use a gate and a vehicle, settlement processing (product registration, payment, and the like) at a register counter is eliminated, and thereby an increase in convenience for a user and saving of time and labor of a store are achieved.

Further, according to the processing apparatus 10 of the present example embodiment, based on an image generated by one camera 5, it is possible to perform recognition of a customer 1 and a product 3, detection that a customer moves outside a reference range 6, and the like. Therefore, burden of a cost such as an equipment expense is reduced.

Herein, a modified example according to the present example embodiment is described.

In the example described above, description has been made, assuming the processing apparatus 10 is used, for example, in a store in which a products such as confectionary, a beverage, and the like is displayed at a part of an office and the like and an employee of the office and the like purchases a product on a self-service basis. However, a usage scene of the processing apparatus 10 is not limited to the above-described scene. The processing apparatus 10 may be used in a location other than an office.

Further, the product placing space 2 may cause a product to be placed thereon, and the product placing space 2 may be configured by using, instead of a platform illustrated in FIG. 1, another article such as a shelf, a box, and a chair.

Figure 12:
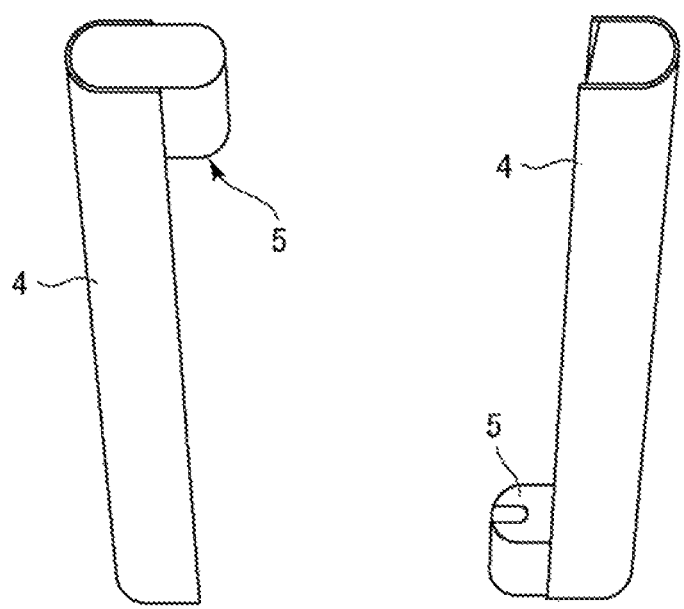
FIG. 12 is a diagram illustrating one example of a product placing space according to the present example embodiment.
Figure 13:
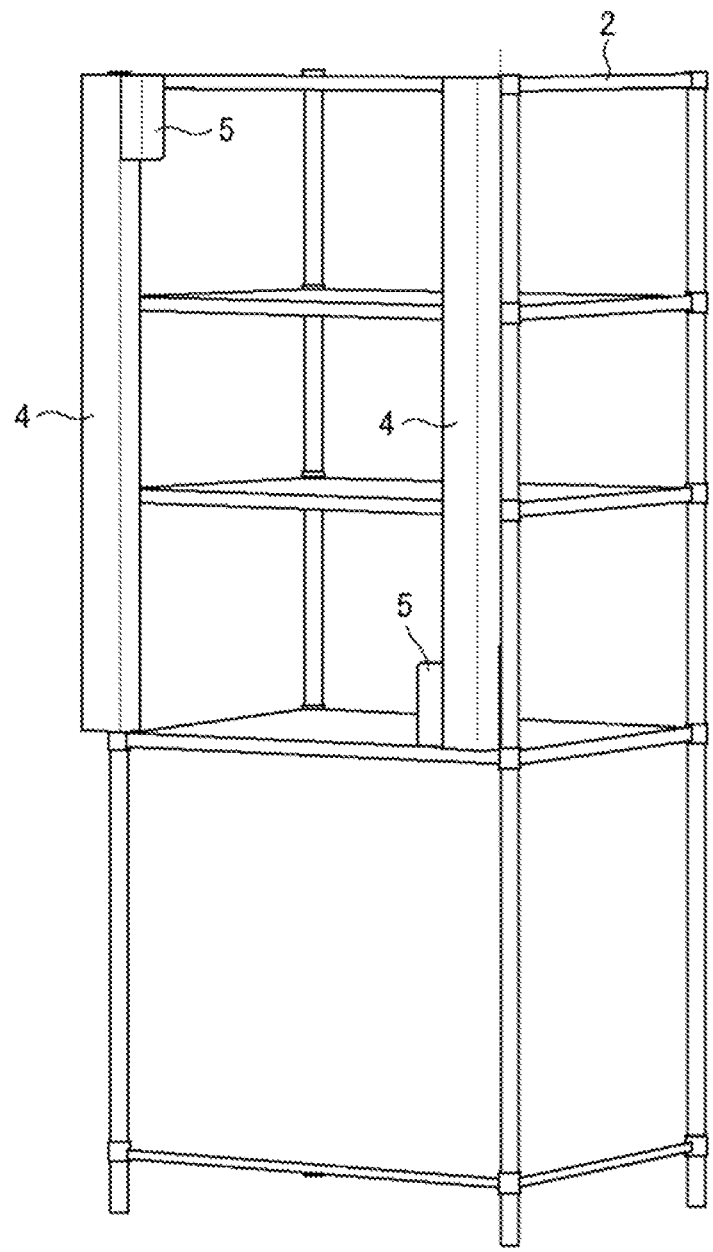
FIG. 13 is a diagram illustrating one example of the product placing space according to the present example embodiment.

FIG. 13 illustrates one example. FIG. 12 is a figure in which a frame 4 in FIG. 13 is extracted. Each of two components configuring the frame 4 is provided with a camera 5 and illumination.

A light emission surface of the illumination is extended in one direction, and includes a light emission unit and a cover covering the light emission unit. The illumination mainly emits light in a direction orthogonal to the extension direction of the light emission surface. The light emission unit includes a light emission element such as an LED, and emits light in a direction which is not covered with the cover. Note that, when the light emission element is an LED, a plurality of LEDs are arranged in a direction (an upper and a lower direction in the figure) where the illumination is extended.

Then, the camera 5 is disposed on one end side of a component of the frame 4 extending linearly, and has an image-capture range in a direction where light of the illumination is emitted. For example, in a component of the frame 4 on a left side in FIG. 12, the camera 5 has an image-capture range on a lower side and a diagonally lower right side. Further, in a component of the frame 4 on a right side in FIG. 12, the camera 5 has an image-capture range on an upper side and a diagonally upper left side.

As illustrated in FIG. 13, the frame 4 is attached to a front frame (or a front surface of each of side walls on both sides) of a product shelf configuring a product placing space. In this case, one component of the frame 4 is attached to one front surface in a direction where the camera 5 is located on a lower side, and the other component of the frame 4 is attached to the other front frame in a direction where the camera 5 is located on an upper side. Then, the camera 5 attached to one component of the frame 4 captures an image of an upper side and a diagonally upper side in such a way as to include an opening of the product shelf as an image-capture range. On the other hand, the camera 5 attached to the other component of the frame 4 captures an image of a lower side and a diagonally lower side in such a way as to include an opening of the product shelf as an image-capture range. In this manner, when two cameras 5 are used, an image of an entire range of an opening of the product shelf can be captured.

Then, the processing apparatus 10 processes images captured by two cameras 5, and thereby generates various types of information indicated in the example embodiment described above. For example, one camera 5 captures an image of an upper side and a diagonally upper side.

Further, in the example illustrated in FIG. 1, the camera 5 is installed in the frame 4, but instead of this configuration, the camera 5 may be installed in another thing such as a ceiling, a wall, or a pillar.

Further, in the example described above, one camera 5 is installed, and thereby one camera captures an image of an image-capture target including a customer 1, a product 3, a reference range 6, and the like. However, a plurality of cameras 5 may be installed, and thereby the plurality of cameras 5 may individually capture an image of an image-capture target. In this case, an image-capture target to be image-captured by each camera 5 is limited (in other words, it is unnecessary to capture an image of every image-capture target), and therefore installation and the like of each camera 5 is made relatively easy.

Further, in the example described above, a customer 1 is recognized by face authentication based on an image. However, a customer 1 may be recognized by a means other than an image analysis. The processing apparatus 10 may recognize a customer 1, for example, based on biological information such as a fingerprint, a voiceprint, and an iris input via a predetermined input apparatus (a fingerprint sensor, a microphone, or the like). In addition, the processing apparatus 10 may acquire, via a reader or the like, customer discrimination information from a mobile apparatus (an IC card, a smartphone, a smartwatch, a tablet terminal, a mobile phone, or the like) of a customer. In a case of this example, an image generated by a camera 5 may not necessarily include a face of a customer 1. Thereby, image-capture targets to be image-captured by the camera 5 are decreased, and therefore the number of required cameras 5 is decreased and the camera 5 is easily installed.

Further, the settlement unit 13 may execute a settlement by using, as a trigger, a fact that a customer 1 is framed out from an image of a camera 5. By doing so, it is unnecessary to previously store, in the storage unit 14, information indicating a reference range 6 in an image, and therefore a processing load on an operator is reduced.

In addition, the settlement unit 13 may execute a settlement in response to, as detection of a fact that a customer 1 performs a predetermined action, detection of a fact that "a customer 1 moves by a predetermined number of steps in a predetermined direction (a direction away from a product placing space)" or detection of a fact that "a customer 1 moves for a predetermined time in a predetermined direction (a direction away from a product placing space)". By doing so, it is unnecessary to previously store, in the storage unit 14, information indicating a reference range 6 in an image, and therefore a processing load on an operator is reduced.

Second Example Embodiment

It is conceivable that an area to which a customer 1 being considering purchase of a product 3 is thought to move while holding the product 3 is different for each customer 1. In other words, it is conceivable that, during consideration, there is a customer 1 staying still in front of a product placing space 2, or there is a customer 1 moving up to a location relatively distant from the product placing space 2. In view of the circumstances, a processing apparatus 10 according to the present example embodiment includes a function of setting a reference range 6 appropriate for each customer 1. Hereinafter, detailed description is made.

Figure 14:
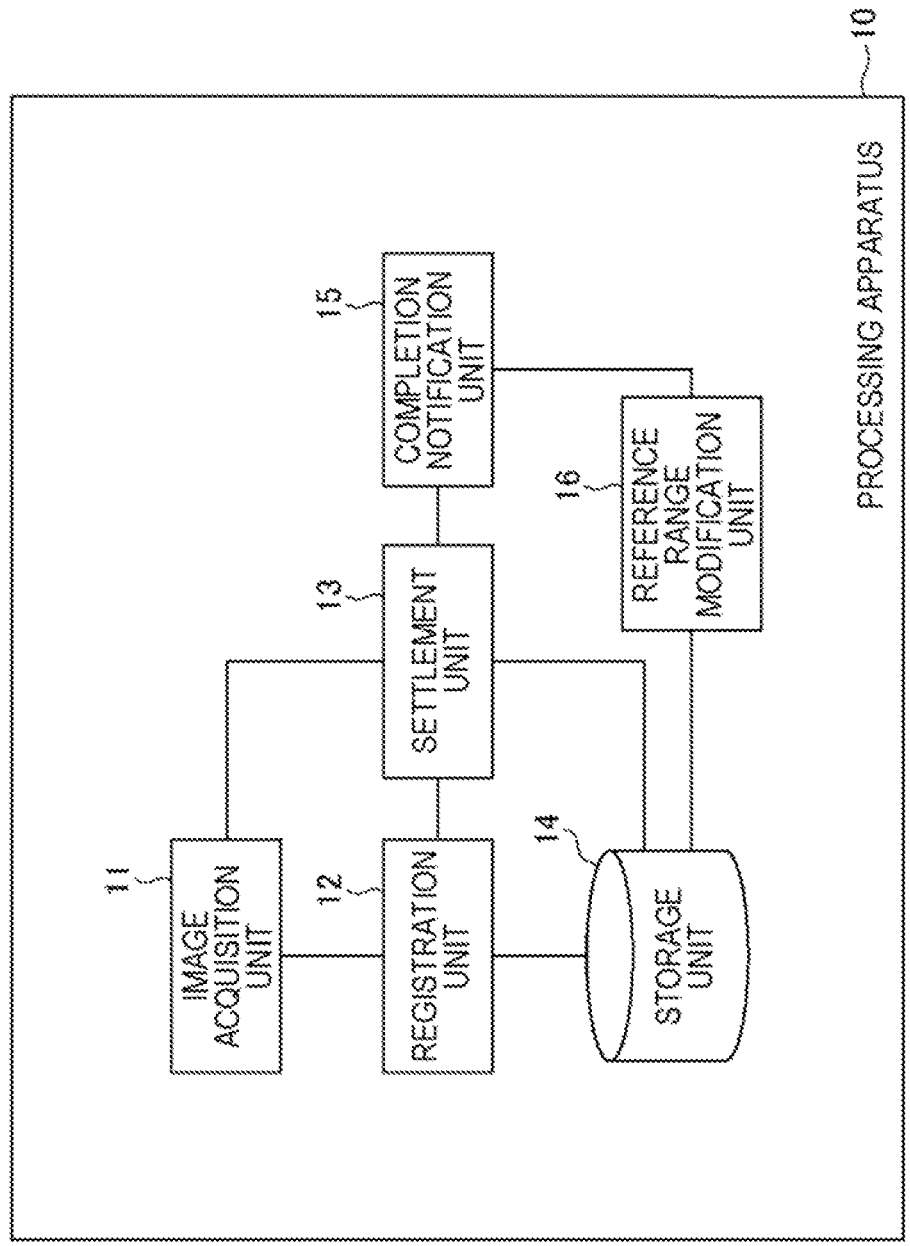
FIG. 14 is one example of a function block diagram of the processing apparatus according to the present example embodiment.

FIG. 14 illustrates one example of a function block diagram of the processing apparatus 10 according to the present example embodiment. As illustrated, the processing apparatus 10 includes an image acquisition unit 11, a registration unit 12, a settlement unit 13, a storage unit 14, a completion notification unit 15, and a reference range modification unit 16.

The storage unit 14 stores information (information indicating a reference range 6 in an image) indicating a reference range 6 for each customer 1. Then, the settlement unit 13 determines, based on information indicating a reference range 6 for each of customers 1, a reference range 6 for each of customers 1, and detects that each customer 1 moves outside the reference range 6.

Figure 15:
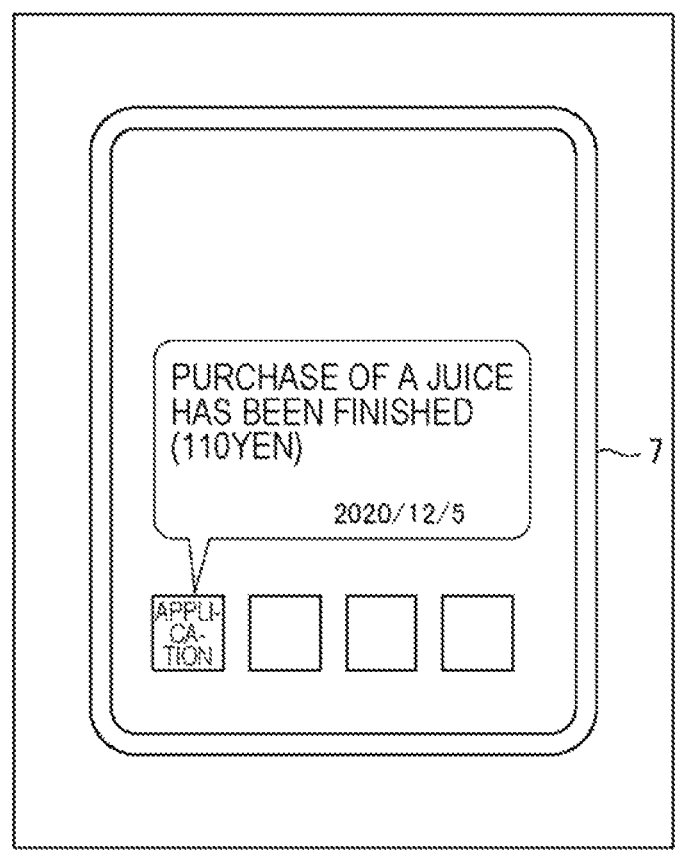
FIG. 15 is a diagram illustrating one example of a settlement completion notification displayed on a terminal apparatus of a customer.

The completion notification unit 15 transmits, after a settlement based on the settlement unit 13, a settlement completion notification to a terminal of a customer 1, and receives, from a terminal apparatus of the customer 1, a response to the settlement completion notification. The settlement completion notification may be achieved, for example, via a predetermined application installed in the terminal of the customer 1, or may be achieved based on another means. FIG. 15 illustrates one example of a settlement completion notification displayed on a terminal apparatus 7 of a customer 1. The illustrated settlement completion notification includes a name of a product 3 being a settlement target, a price, a settlement time and date, and the like.

While not illustrated, the terminal apparatus 7 may receive, from a screen of the settlement completion notification, as a response to the notification, "input indicating that there is no problem" and "input indicating that the product 3 is not purchased". Then, the terminal apparatus 7 may transmit the response to the processing apparatus 10.

The reference range modification unit 16 modifies, when a response to a settlement completion notification indicates a fact that a product 3 indicated by a settlement completion notification is not purchased, a reference range 6 of the customer 1 in such a way as to be wider, and stores information indicating a content after modification in the storage unit 14.

Herein, one example of an algorithm for processing of modifying a reference range 6 with respect to each customer 1 is described. The reference range modification unit 16 may determine, for example, based on an image generated by a camera 5, a movement track of a customer 1 (the customer 1 having executed "input of a fact that a product 3 is not purchased") while holding the product 3 (the product 3 subjected to input of a fact that no purchase is made). Then, the reference range modification unit 16 may determine, based on the determined movement track, a reference range 6 for the customer 1. The reference range modification unit 16 may determine a reference range 6 for the customer 1, for example, in such a way as to include the determined movement track. Note that, based on machine learning using the determined movement track as learning data, a reference range 6 for each customer 1 may be determined.

Other configurations of the processing apparatus 10 according to the present example embodiment are similar to those of the first example embodiment.

As described above, according to the processing apparatus 10 of the present example embodiment described above, an advantageous effect similar to the first example embodiment is achieved. Further, according to the processing apparatus 10 of the present example embodiment, an appropriate reference range 6 is set for each customer 1. Therefore, inconvenience in which, before purchase of a product 3 held by a customer 1 is determined, settlement processing is erroneously executed can be reduced.

Third Example Embodiment

A settlement unit 13 according to the present example embodiment monitors, after product discrimination information is associated with customer discrimination information, an elapsed time from a fact that the product discrimination information is associated with the customer discrimination information while it is not detected that a product 3 is returned to a product placing space 2 or a customer 1 moves outside a reference range 6. Then, the settlement unit 13 executes a settlement based on a registration content resulting from a registration unit 12, without detecting, when the elapsed time exceeds a threshold, that the customer 1 moves outside the reference range 6.

Other configurations of the processing apparatus 10 according to the present example embodiment are similar to those of the first and second example embodiments.

As described above, according to the processing apparatus 10 of the present example embodiment described above, an advantageous effect similar to the first and second example embodiments is achieved. Further, according to the processing apparatus 10 of the present example embodiment, even when it is not detected, due to some kind of trouble, that a customer 1 (a customer 1 for whom product discrimination information is registered in association with customer discrimination information in recognition information (see FIG. 10)) holding a product 3 moves outside a reference range 6, settlement processing can be executed in response to a predetermined time lapse. As a result, settlement omission can be reduced.

Fourth Example Embodiment

A settlement unit 13 according to the present example embodiment detects, based on image processing, a change of a direction of a body of a customer 1, and executes, based on the detection result, settlement processing. The settlement unit 13 may execute, when, for example, a direction of a body of a customer 1 (a customer 1 for whom product discrimination information is registered in association with customer discrimination information in recognition information (see FIG. 10)) holding a product 3 satisfies a predetermined condition (facing a 180-degree opposite side from a state of directly facing a product placing space 2), a settlement based on a registration content resulting from a registration unit 12 without detecting that the customer 1 moves outside a reference range 6.

It is conceivable that a customer 1 having determined purchase of a product 3 being held changes a direction of a body and departs from a front of the product placing space 2. On the other hand, it is conceivable that a customer 1 being considering whether to purchase a product 3 being held is located in a periphery of the product placing space 2 while substantially facing the product placing space 2. Therefore, the settlement unit 13 may execute a settlement, as in the example described above, in response to a fact that a direction of a body of a customer 1 satisfies a predetermined condition.

In addition, the settlement unit 13 may execute a settlement based on a registration content resulting from the registration unit 12 in response to a fact that a direction of a body of a customer 1 (a customer 1 for whom product discrimination information is registered in association with customer discrimination information in recognition information (see FIG. 10)) holding a product 3 satisfies a predetermined condition (facing a 180-degree opposite side from a state of directly facing the product placing space 2) and a fact that it is detected that the customer 1 moves outside a reference range 6.

As describe above, it is conceivable that a customer 1 being considering whether to purchase a product 3 being held is located in a periphery of the product placing space 2 while substantially facing the product placing space 2. However, a customer 1 may go out of a reference range 6 while facing the product placing space 2 during consideration. When a settlement is executed under a condition in that a movement outside a reference range 6 is merely made, inconvenience in which a settlement is executed during consideration of product purchase may occur. Therefore, the settlement unit 13 may execute a settlement in response to a fact that a direction of a body of a customer 1 satisfies a predetermined condition (facing a 180-degree opposite side from a state of directly facing the product placing space 2) and a fact that it is detected that the customer 1 moves outside a reference range 6. By doing so, occurrence of the inconvenience can be reduced.

Other configurations of the processing apparatus 10 according to the present example embodiment are similar to those of the first to third example embodiments.

As described above, according to the processing apparatus 10 of the present example embodiment described above, an advantageous effect similar to the first to third example embodiments is achieved. Further, according to the processing apparatus 10 of the present example embodiment, a settlement can be executed at an appropriate timing.

Fifth Example Embodiment

A settlement unit 13 according to the present example embodiment executes a settlement in response to a fact that it is detected that a customer 1 moves outside a reference range 6, but the settlement unit 13 does not execute a settlement by using, as a trigger, a fact that it is detected that a customer 1 moves outside a reference range 6 but executes a settlement by using, as a trigger, a fact that it is detected that predetermined processing to be executed by using, as a trigger, a fact that it is detected that a customer 1 moves outside a reference range 6 is executed.

Specifically, the settlement unit 13 transmits, to a terminal apparatus 7 of a customer 1, information indicating a settlement content determined based on a registration content resulting from a registration unit 12, by using, as a trigger, a fact that the customer 1 moves outside a reference range 6, and receives a response of whether the settlement content is correct from the terminal apparatus 7 of the customer 1.

The information indicating a settlement content includes a name, a price, and the like of a product 3 being a settlement target. Transmission of information indicating a settlement content to a terminal apparatus 7 of a customer 1 and reception of a response from the terminal apparatus 7 of the customer 1 may be achieved, for example, via a predetermined application installed in a terminal of the customer 1, or may be achieved based on another means.

Then, the settlement unit 13 executes, by using, as a trigger, reception of a response in that a settlement content is correct, a settlement for a price indicated by the settlement content.

Other configurations of the processing apparatus 10 according to the present example embodiment are similar to those of the first to fourth example embodiments.

As described above, according to the processing apparatus 10 of the present example embodiment described above, an advantageous effect similar to the first to fourth example embodiments is achieved. Further, according to the processing apparatus 10 of the present example embodiment, in advance, processing for confirmation with a customer 1 is executed before a settlement, and therefore inconvenience in which a settlement is executed based on an incorrect content can be reduced.

While the invention of the present application has been particularly described with reference to example embodiments (and examples), the invention of the present application is not limited to these example embodiments (and examples) described above. It will be understood by those of ordinary skill in the art that various changes in form and details may be made therein within the scope of the invention of the present application.

The whole or part of the example embodiments described above can be described as, but not limited to, the following supplementary notes.

1. A processing apparatus including:
a registration means for recognizing, based on image processing, product discrimination information of a product picked up from a product placing space, and registering the recognized product discrimination information in association with customer discrimination information; and
a settlement means for executing, when it is detected, based on image processing, that a customer having picked up the product performs a predetermined action, a settlement based on a registration content resulting from the registration means.

2. The processing apparatus according to supplementary note 1, wherein
the registration means recognizes customer discrimination information of the customer included in an image, and registers the recognized customer discrimination information in association with the recognized product discrimination information.

3. The processing apparatus according to supplementary note 1 or 2, wherein
the registration means and the settlement means process an image generated by the same camera, and perform recognition of the product discrimination information and detection that the customer performs the predetermined action.

4. The processing apparatus according to any one of supplementary notes 1 to 3, wherein
the settlement means
transmits, to a terminal apparatus of the customer, in response to a fact that it is detected that the customer performs the predetermined action, information indicating a settlement content determined based on the registration content,
receives, from the terminal apparatus of the customer, a response of whether the settlement content is correct, and
executes a settlement for a price indicated by the settlement content in response to reception of a response of a fact that the settlement content is correct.

5. The processing apparatus according to any one of supplementary notes 1 to 4, wherein
the settlement means executes a settlement based on the registration content without detecting that the customer performs a predetermined action, when an elapsed time from a time at which the product discrimination information is associated with the customer discrimination information exceeds a threshold.

6. The processing apparatus according to any one of supplementary notes 1 to 5, wherein
the registration means registers the customer discrimination information determined by a face image or an iris, in association with the product discrimination information.

7. The processing apparatus according to any one of supplementary notes 1 to 6, wherein
the registration means detects, based on image processing, that the customer returns the product to the product placing space, and deletes, from information associating the product discrimination information with the customer discrimination information, the product discrimination information of the product returned to the product placing space.

8. The processing apparatus according to any one of supplementary notes 1 to 7, wherein
the settlement means detects, based on image processing, that a direction of a body of the customer satisfies a predetermined condition, detects that the customer moves by a predetermined number of steps in a predetermined direction, or detects that the customer moves for a predetermined time in a predetermined direction, as the predetermined action.

9. The processing apparatus according to any one of supplementary notes 1 to 8, wherein
the settlement means detects, as the predetermined action, that the customer moves outside a reference range determined based on the product placing space.

10. The processing apparatus according to supplementary note 9, wherein
the reference range is an area in front of the product placing space.

11. The processing apparatus according to supplementary note 9 or 10, wherein
the settlement means determines, based on information indicating the reference range of each of customers, the reference range for each of the customers,
the processing apparatus further including:
a completion notification means for transmitting, to the terminal apparatus of the customer, a settlement completion notification after a settlement based on the settlement means, and receiving, from the terminal apparatus of the customer, a response to the settlement completion notification; and
a reference range modification means for widening, when a response to the settlement completion notification indicates that a product indicated by the settlement completion notification is not purchased, the reference range of the customer.

12. A processing method including:
by a computer,
recognizing, based on image processing, product discrimination information of a product picked up from a product placing space, and registering the recognized product discrimination information in association with customer discrimination information; and
executing, when it is detected, based on image processing, that a customer having picked up the product performs a predetermined action, s settlement based on a registration content of the product discrimination information.

13. A program for causing a computer to function as:
a registration means for recognizing, based on image processing, product discrimination information of a product picked up from a product placing space, and registering the recognized product discrimination information in association with customer discrimination information; and
a settlement means for executing, when it is detected, based on image processing, that a customer having picked up the product performs a predetermined action, a settlement based on a registration content resulting from the registration means.

What is claimed is:

1. A processing apparatus comprising:
   at least one memory configured to store one or more instructions; and
   at least one processor configured to execute the one or more instructions to:
      receive, from a camera, an image of an area of a front of a product placing place, the image encompassing a reference range;
      recognize, based on image processing, product discrimination information of a product picked up from the product placing space, and register the recognized product discrimination information in association with customer discrimination information;
      execute, when it is detected, based on processing the image from the camera, that a customer having picked up the product performs a predetermined action, a settlement based on a registration content, wherein the predetermined action comprises detecting, based on the processor processing the image, that the customer moves a body part from inside the reference range to outside the reference range; and
      set a size of the reference range for each customer, wherein executing the settlement based on the registration content comprises:
         transmitting, to a terminal apparatus of the customer, information indicating a settlement content determined based on the registration content;
         receiving, from the terminal apparatus of the customer, a response of whether the settlement content is correct; and
         executing the settlement for a price indicated by the settlement content in response to reception of a response of a fact that the settlement content is correct,
      wherein the predetermined action further comprises at least one of a direction of the body of the customer satisfying a predetermined condition, the customer moving by a predetermined number of steps in a first predetermined direction, and the customer moving for a predetermined time in a second predetermined direction.

2. The processing apparatus according to claim 1, wherein the processor is further configured to execute the one or more instructions to recognize customer discrimination information of the customer included in the image, and register the recognized customer discrimination information in association with the recognized product discrimination information.

3. The processing apparatus according to claim 1, wherein the processor is further configured to execute the one or more instructions to execute the settlement based on the registration content without detecting that the customer performs the predetermined action, when an elapsed time from a time at which the product discrimination information is associated with the customer discrimination information exceeds a threshold.

4. The processing apparatus according to claim 1, wherein the processor is further configured to execute the one or more instructions to register the customer discrimination information determined by a face image or an iris, in association with the product discrimination information.

5. The processing apparatus according to claim 1, wherein the processor is further configured to execute the one or more instructions to detect, based on image processing, that the customer returns the product to the product placing space, and delete, from information associating the product discrimination information with the customer discrimination information, the product discrimination information of the product returned to the product placing space.

6. The processing apparatus according to claim 1, wherein executing the settlement based on the registration content comprises:
   determining, based on information indicating the reference range of each of customers, the reference range for each of the customers,
   transmitting, to the terminal apparatus of the customer, a settlement completion notification after the settlement and receive, from the terminal apparatus of the customer, a response to the settlement completion notification; and
   widening, when the response to the settlement completion notification indicates that a product indicated by the settlement completion notification is not purchased, the reference range of the customer.

7. A processing method comprising:
   by a computer,
      receiving, from a camera, an image of an area of a front of a product placing place, the image encompassing a reference range;
      recognizing, based on image processing, product discrimination information of a product picked up from the product placing space, and registering the recognized product discrimination information in association with customer discrimination information;
      executing, when it is detected, based on image processing, that a customer having picked up the product performs a predetermined action, a settlement based on a registration content of the product discrimination information, wherein the predetermined action comprises detecting that the customer moves a body part from inside the reference range to outside the reference range; and
      setting a size of the reference range for each customer, wherein executing the settlement based on the registration content comprises:
         transmitting, to a terminal apparatus of the customer, information indicating a settlement content determined based on the registration content;
         receiving, from the terminal apparatus of the customer, a response of whether the settlement content is correct; and
         executing the settlement for a price indicated by the settlement content in response to reception of a response of a fact that the settlement content is correct,
      wherein the predetermined action further comprises at least one of a direction of the body of the customer satisfying a predetermined condition, the customer moving by a predetermined number of steps in a first predetermined direction, and the customer moving for a predetermined time in a second predetermined direction.

8. A non-transitory storage medium storing a program for causing a computer to:
   receive, from a camera, an image of an area of a front of a product placing place, the image encompassing a reference range;

recognize, based on image processing, product discrimination information of a product picked up from a product placing space, and register the recognized product discrimination information in association with customer discrimination information;

execute, when it is detected, based on image processing, that a customer having picked up the product performs a predetermined action, a settlement based on a registration content, wherein the predetermined action comprises detecting that the customer moves a body part from inside the reference range to outside the reference range; and set a size of the reference range for each customer, wherein executing the settlement based on the registration content comprises:

transmitting, to a terminal apparatus of the customer, information indicating a settlement content determined based on the registration content;

receiving, from the terminal apparatus of the customer, a response of whether the settlement content is correct; and executing the settlement for a price indicated by the settlement content in response to reception of a response of a fact that the settlement content is correct, wherein the predetermined action further comprises at least one of a direction of the body of the customer satisfying a predetermined condition, the customer moving by a predetermined number of steps in a first predetermined direction, and the customer moving for a predetermined time in a second predetermined direction.

9. The processing apparatus according to claim 1, wherein the processor is further configured to execute the one or more instructions to modify, for each customer, the reference range based on a movement track of each customer being in front of the product placing space while holding the product.

* * * * *